US012013935B2

(12) United States Patent
Davidovich et al.

(10) Patent No.: US 12,013,935 B2
(45) Date of Patent: Jun. 18, 2024

(54) RETURN-ORIENTED PROGRAMMING PROTECTION

(71) Applicant: C2A-SEC, LTD., Jerusalem (IL)

(72) Inventors: Yitzhack Davidovich, Jerusalem (IL); Yoav Fuchs, Har Gillo (IL); Nir Brakha, Tel Aviv-Jaffa (IL)

(73) Assignee: C2A-SEC, Ltd., Jerusalem (IL)

( * ) Notice: Subject to any disclaimer, the term of this patent is extended or adjusted under 35 U.S.C. 154(b) by 301 days.

(21) Appl. No.: 17/436,098

(22) PCT Filed: Mar. 5, 2020

(86) PCT No.: PCT/IL2020/050264
§ 371 (c)(1),
(2) Date: Sep. 3, 2021

(87) PCT Pub. No.: WO2020/178840
PCT Pub. Date: Sep. 10, 2020

(65) Prior Publication Data
US 2022/0188414 A1    Jun. 16, 2022

Related U.S. Application Data

(60) Provisional application No. 62/814,009, filed on Mar. 5, 2019.

(51) Int. Cl.
*G06F 21/55* (2013.01)
(52) U.S. Cl.
CPC ...... *G06F 21/554* (2013.01); *G06F 2221/034* (2013.01)

(58) Field of Classification Search
CPC ............ G06F 21/554; G06F 2221/034; G06F 2221/033; G06F 21/562; G06F 21/54;
(Continued)

(56) References Cited

U.S. PATENT DOCUMENTS 9,292,684 B2    3/2016  Guidry
9,392,017 B2 *  7/2016  Cui .................... H04L 63/145
(Continued)

FOREIGN PATENT DOCUMENTS

JP    2014526751 A    10/2014
JP    2015527680 A     9/2015
(Continued)

OTHER PUBLICATIONS

Huang et al.; "A Dynamic Detection Method Against ROP and JOP", 2012, International Conference on Systems and Informatics (ICSAI 2012), pp. 1-6. (Year: 2012).*
(Continued)

*Primary Examiner* — Matthew Smithers
(74) *Attorney, Agent, or Firm* — Webb and Co., Ltd.

(57) ABSTRACT

An ROP attack protection method for a plurality of ECUs, the method constituted of: receiving data destined for one of the plurality of ECUs; determining which of the plurality of ECUs the received data is destined for; responsive to a unique model associated with the determined ECU, analyzing the received data to identify control flow instructions addressed to one or more predetermined addresses; responsive to the analyzation, generate a statistical analysis of the identified control flow instructions; and responsive to the generated statistical analysis, outputting a signal indicating a possibility of an attack.

18 Claims, 6 Drawing Sheets

(58) Field of Classification Search
CPC .. H04L 63/0245; H04L 63/1466; H04W 4/44; H04W 12/121
See application file for complete search history.

(56) References Cited

U.S. PATENT DOCUMENTS

| | | | | |
|---|---|---|---|---|
| 9,495,541 | B2* | 11/2016 | Polychronakis | G06F 21/54 |
| 9,519,773 | B2* | 12/2016 | Patel | G06F 9/30054 |
| 9,594,912 | B1* | 3/2017 | Thioux | G06F 21/577 |
| 9,703,948 | B2* | 7/2017 | Caprioli | G06F 9/30145 |
| 9,767,272 | B2* | 9/2017 | Shanbhogue | G06F 9/30054 |
| 10,025,927 | B1 | 7/2018 | Khalid | |
| 10,049,211 | B1* | 8/2018 | Lukacs | G06F 21/566 |
| 10,496,812 | B2 | 12/2019 | Guidry | |
| 10,885,184 | B1* | 1/2021 | Schnidrig | G06F 21/54 |
| 11,010,471 | B2* | 5/2021 | Usui | G06F 21/54 |
| 11,023,574 | B2* | 6/2021 | Harel | G06F 11/3668 |
| 2012/0167120 | A1* | 6/2012 | Hentunen | G06F 21/577 719/320 |
| 2014/0075556 | A1 | 3/2014 | Wicherski | |
| 2014/0123281 | A1* | 5/2014 | Fischer | G06F 21/552 726/23 |
| 2015/0095628 | A1* | 4/2015 | Yamada | G06F 12/0875 712/234 |
| 2015/0128266 | A1 | 5/2015 | Tosa | |
| 2015/0150127 | A1* | 5/2015 | Ning | G06F 21/57 726/22 |
| 2016/0021134 | A1* | 1/2016 | Li | G06F 21/567 726/23 |
| 2016/0094552 | A1* | 3/2016 | Durham | G06F 21/00 713/171 |
| 2016/0196427 | A1* | 7/2016 | Davidov | G06F 21/554 726/23 |
| 2017/0083355 | A1* | 3/2017 | Benoit | G06F 9/30098 |
| 2017/0116418 | A1 | 4/2017 | Shanmugavelayutham | |
| 2017/0149820 | A1* | 5/2017 | Ruvio | H04L 63/1466 |
| 2017/0243002 | A1 | 8/2017 | Polychronakis | |
| 2017/0316201 | A1* | 11/2017 | Yamada | G06F 9/30061 |
| 2017/0357808 | A1* | 12/2017 | Arroyo | G06F 21/57 |
| 2018/0096140 | A1* | 4/2018 | Bulygin | G06F 21/52 |
| 2018/0181755 | A1* | 6/2018 | Li | G06F 9/30061 |
| 2020/0128031 | A1* | 4/2020 | Juliato | G05D 1/0088 |
| 2023/0091941 | A1* | 3/2023 | Kipnis | G06F 21/52 |

FOREIGN PATENT DOCUMENTS

| | | | |
|---|---|---|---|
| JP | 2017126978 A | 7/2017 | |
| WO | WO-2012084507 A1 * | 6/2012 | G06F 21/54 |
| WO | 2018066516 A1 | 4/2018 | |

OTHER PUBLICATIONS

Arnautov et al.; "Control Freak: Signature Chaining to Counter Control Flow Attacks", 2015, IEEE 34th Symposium on Reliable Distributed Systems, pp. 84-93. (Year: 2015).*
Davi et al.; "ROPdefender: A Detection Tool to Defend Against Return-Oriented Programming Attacks", Mar. 2011, ACM, pp. 40-51. (Year: 2011).*
Hota et al.; "Tamper-Resistant Code Using Optimal ROP Gadgets for IoT Devices", 2017, IEEE, pp. 570-575. (Year: 2017).*
Huang et al.; "A Dynamic Detective Method against ROP Attack on ARM Platform", 2012, IEEE, pp. 51-57. (Year: 2012).*
Elsabagh et al.; "Detecting ROP with Statistical Learning of Program Characteristics", 2017, ACM, pp. 219-226. (Year: 2017).*
Gupta et all.; "Marlin: Mitigating Code Reuse Attacks Using Code Randomization", 2015, IEEE Transactions on Dependable and Secure Computing, vol. 12, No. 3, pp. 326-337. (Year: 2015).*
McLaughlin et al., (2016) The Cybersecurity Landscape in Industrial Control Systems. Proceedings of the IEEE 104(5):1039-1057.

* cited by examiner

| ADDRESS | GADGET |
|---|---|
| 1000 | 0 |
| 1004 | 1 |
| 1008 | 1 |
| 1012 | 0 |

RETURN-ORIENTED PROGRAMMING PROTECTION

CROSS-REFERENCE TO RELATED APPLICATIONS

The present application claims priority of U.S. provisional patent application Ser. No. 62/814,009, filed Mar. 5, 2019 and entitled "RETURN-ORIENTED PROGRAMMING PROTECTION", the entire contents of which incorporated herein by reference.

FIELD OF THE INVENTION

The invention relates generally to the field of security devices, and more specifically a system and method for protecting against return-oriented programming (ROP) attacks.

BACKGROUND OF THE INVENTION

ROP is a computer security exploit technique which allows an attacker to execute malicious code even in the presence of security defenses such as executable space protection and code signing. With ROP, the attacker gains control of the control flow instruction stack and hijacks the program control flow. The attacker can then execute carefully chosen machine instruction sequences which are already present in the device's memory. These sequences are called 'gadgets'. Each gadget typically ends in a return instruction and is located in a subroutine within the existing program and/or in a shared library code. Chained together, these gadgets allow an attacker to perform arbitrary operations even in a device employing defenses which can thwart simpler attacks.

One example of a method of protecting against ROP attacks is address space layout randomization (ASLR). In ASLR, every time the program is run, components are randomly moved to different addresses in the virtual memory. Many methods for protection against ROP attacks require adjusting the binary, by modifying different opcodes within the binary. Unfortunately, in some cases, the binary is not made available for modification due to safety or warranty concerns.

SUMMARY

Accordingly, it is a principal object of the present invention to overcome at least some of the disadvantages of the prior art. In certain embodiments this is provided by a return-oriented programming (ROP) attack protection method for a plurality of electronic control units (ECUs), the method comprising: receiving data destined for one of the plurality of ECUs; determining which of the plurality of ECUs the received data is destined for; responsive to a unique model associated with the determined ECU, analyzing the received data to identify control flow instructions addressed to one or more predetermined addresses; responsive to the analyzation, generate a statistical analysis of the identified control flow instructions; responsive to the generated statistical analysis, detecting the presence of an ROP attack; and outputting a signal indicating the detected presence of an ROP attack.

In one embodiment, wherein each of the one or more predetermined addresses contains code of a respective gadget. In another embodiment, the generated statistical analysis comprises the number of the identified control flow instructions within a predetermined window within the received data, the detection of the presence of an ROP attack responsive to the number of the identified control flow instructions within the predetermined window exceeding a predetermined window value.

In one embodiment, the detecting the presence of an ROP attack is further responsive to the respective unique model. In another embodiment, the generated statistical analysis comprises the number of the identified control flow instructions within a chain of the identified control flow instructions, the detection of the presence of an ROP attack responsive to the number of the identified control flow instructions within the chain of the identified control flow instructions exceeding a predetermined chain value.

In one embodiment, the output signal controls a domain control unit (DCU) to block further data from being transferred to the plurality of ECUs.

In one independent embodiment, a return-oriented programming (ROP) attack protection system is provided, the system comprising: a processor; and a memory, the memory having stored therein a plurality of a unique models, each unique model associated with a respective one of a plurality of electronic control units (ECUs), wherein the processor is arranged to: receive data destined for one of the plurality of ECUs; determine which of the plurality of ECUs the received data is destined for; responsive to the respective unique model associated with the determined ECU, analyze the received data to identify control flow instructions addressed to one or more predetermined addresses; responsive to the analyzation, generate a statistical analysis of the identified control flow instructions; responsive to the generated statistical analysis, detect the presence of an ROP attack; and output a signal indicating the detected presence of an ROP attack.

In one embodiment, each of the one or more predetermined addresses contains code of a respective gadget. In another embodiment, the generated statistical analysis comprises the number of the identified control flow instructions within a predetermined window within the received data, the detection of the presence of an ROP attack responsive to the number of the identified control flow instructions within the predetermined window exceeding a predetermined window value.

In one embodiment, the detection of the presence of an ROP attack is further responsive to the respective unique model. In another embodiment, the generated statistical analysis comprises the number of the identified control flow instructions within a chain of the identified control flow instructions, the detection of the presence of an ROP attack responsive to the number of the identified control flow instructions within the chain of the identified control flow instructions exceeding a predetermined chain value.

In one embodiment, the output signal controls a domain control unit (DCU) to block further data from being transferred to the plurality of ECUs.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1A:
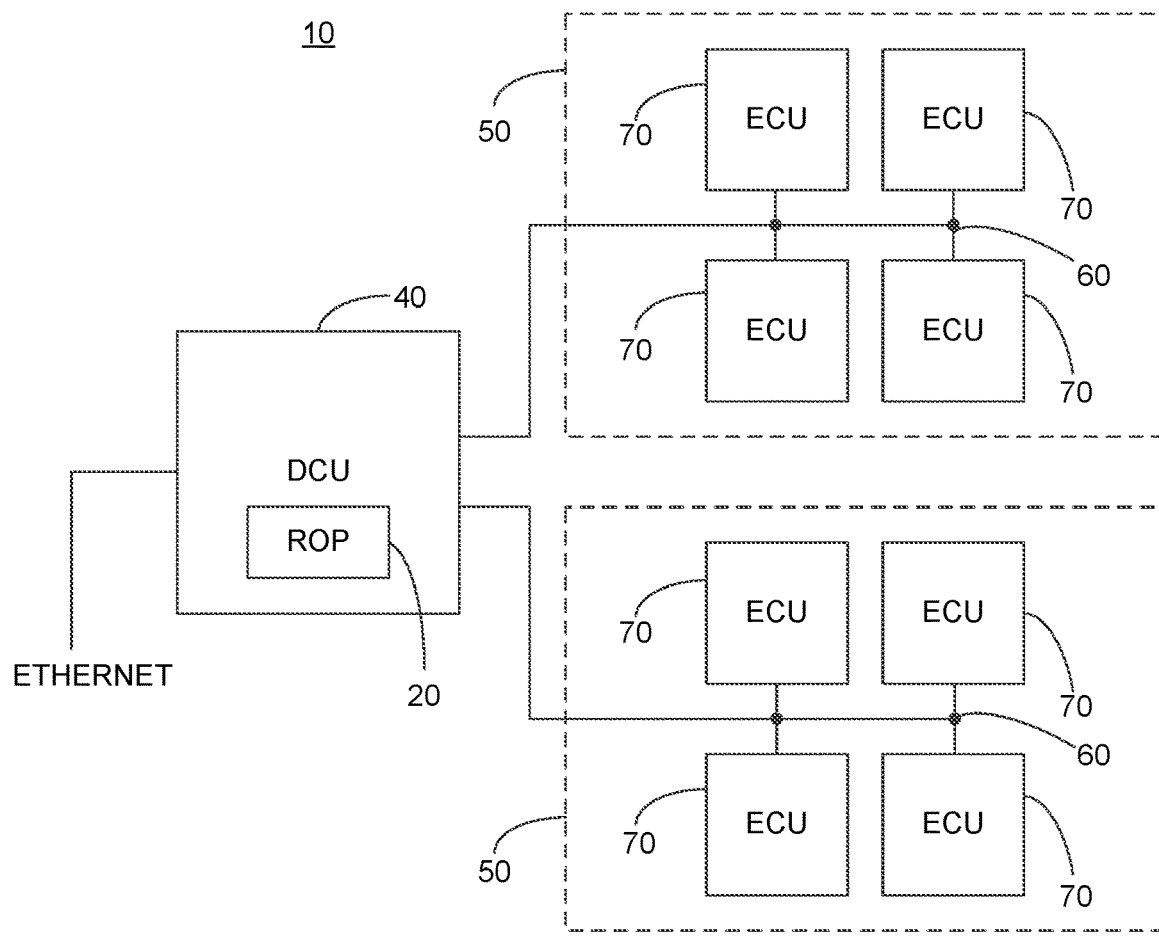
FIGS. 1A-1D illustrate various high level schematic diagrams of an ROP attack protection apparatus, in accordance with certain embodiments.

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

Figure 1B:
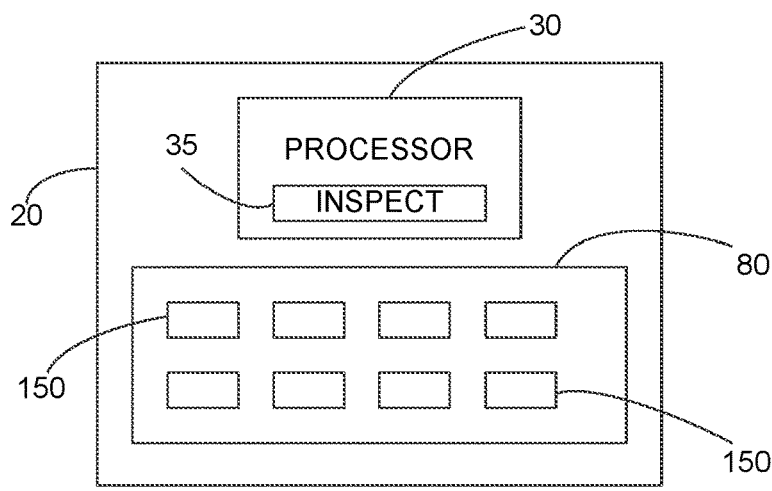
Figures 1C, 1D:
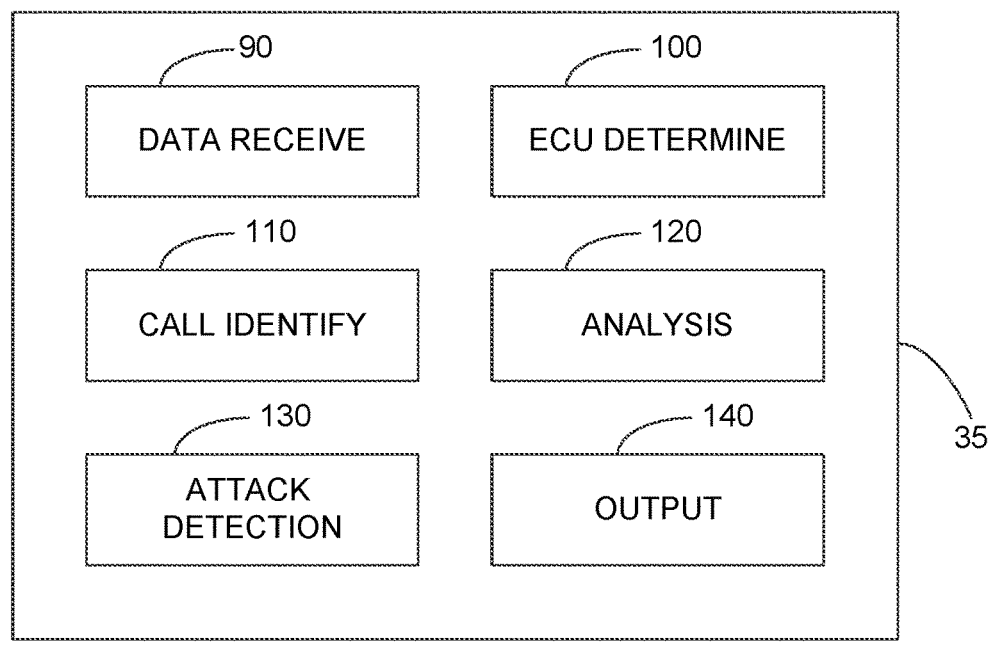

FIG. 1A illustrates a high level schematic diagram of an automotive communication network 10 comprising an ROP attack protection system 20, FIG. 1B illustrates a high level schematic diagram of ROP attack protection system 20 and FIG. 1C illustrates a high level schematic diagram of an embodiment of a processor 30 of ROP attack protection system 20. Automotive communication network 10 comprises: ROP attack protection system 20; a domain controller unit (DCU) 40; and a plurality of controller area network (CAN) bus networks 50. Each CAN bus network 50 comprises: a CAN bus 60; and a plurality of ECUs 70 coupled to CAN bus 60. In one embodiment, ROP attack protection system 20 is implemented as part of DCU 40. ROP attack protection system 20 comprises: processor 30; and a memory 80. Processor 30 comprises an inspection program 35. Inspection program 35 comprises: a data receive functionality 90; an ECU determination functionality 100; a control flow instruction identification functionality 110; an analysis functionality 120; an attack detection functionality 130; and an output functionality 140. Memory 80 has stored therein a plurality of ECU models 150. In one non-limiting embodiment, processor 30 is arranged to operate responsive to computer readable instructions stored on memory 80. In one embodiment, DCU 40 and ECUs 70 operate in accordance with automotive open system architecture (AUTOSAR). In another embodiment, DCU 40 and ECUs 70 operate in a Linux system. Each CAN bus network 50 is in communication with a respective output of DCU 40 and an input of DCU 40 is in communication with an Ethernet network. In one embodiment, memory 80 comprises a portion of a system memory.

The term "control flow instruction", as used herein, is meant as an instruction that controls the flow of the program to access a certain memory address. In one non-limiting embodiment, control flow instructions comprise any of: calls; branches; or jumps.

FIG. 1D illustrates an example of an ECU model 150 for a particular one of ECUs 70. Particularly, for each address indicator of a predefined data size, the data associated with the address indicator is marked with a flag indicating the presence, or absence, of a gadget within the target address space. Preferably, the predefined data size is 4 bytes, i.e. a double word (DWORD). Specifically, in one illustrated embodiment, in the event that the target address space reflected by the address indicator contains a gadget, a '1' is stored associated with the address indicator, and in the event that the target address space reflected by the address indicator does not contain a gadget, a '0' is stored associated with the address indicator. The term gadget, as used herein, is meant to refer to a sequence of instructions, which ends with a return instruction and comprises no more than a predetermined number of instructions, as known to those skilled in the art. In one non-limiting embodiment, the predetermined number of instructions is 5. In another embodiment, ECU models 150 are combined together in a single array. ECU models 150 are generated, in advance, by scanning the respective binary and identifying each gadget in the binary and the respective address in the system memory containing the code of the gadget, as known to those skilled in the art at the time of the invention.

In one embodiment, each ECU model 150 comprises information regarding acceptable chains of gadgets for the respective ECU 70. Particularly, a chain of gadgets is a number of gadgets where each gadget in the chain initiated a control flow instruction to the address of another gadget in the chain. Alternatively, gadgets within the chain can initiate a control flow instruction to an address within a predetermined distance of the address of another gadget in the chain. The allowable chains of gadgets are determined from the binary of the respective ECU 70.

In an AUTOSAR configuration, ECUs 70 operated without ASLR, therefore the addresses of the gadgets don't change except when ECUs 70 are updated. In the event of a system where ECUs 70 operate with ASLR, the addresses of each ECU model 150 are updated in accordance with the new addresses of the ASLR.

In one embodiment, data receive functionality 90, ECU determination functionality 100, control flow instruction identification functionality 110, analysis functionality 120, attack detection functionality 130 and output functionality 140 each comprise a respective section of code in inspection program 35.

In operation, an Ethernet packet is received by DCU 40 and data receive functionality 90 receives the data of the packet in processor 30 of ROP attack protection system 20. In one embodiment, where DCU 40 operates in accordance with AUTOSAR, inspection program 35 is implemented as a callback function which is configured be called when a driver of DCU 40 finishes receiving the packet. Particularly, in one embodiment the callback is implemented upon a receiver flag of the driver being set. In another embodiment, where DCU 40 operates in a Linux system and inspection program 35 is a shared object, as will be described below, the LD-PRELOAD command is utilized to call the shared inspection program 35. After completing its operation, inspection program 35 calls the original code to continue regular operation.

ECU determination functionality 100 analyzes the received data of the packet to determine whether the received packet is destined to one of ECUs 70. Additionally, ECU determination functionality determines which ECU 70 is the destination of the packet. In one embodiment, ECU determination functionality 100 determines the destination of the packet responsive to a predetermined routing model. The predetermined routing model is generated responsive to the configuration file of DCU 40. Particularly, the configuration file of DCU 40 defines the routing policy of received signals, i.e. where each signal is to be routed to. Thus, the routing model contains a unique identifier for each ECU 70 and ECU determination functionality 100 identifies which unique identifier is contained in the packet, i.e. which ECU 70 is the destination of the packet. In one embodiment, the destination of the data packet is determined responsive to a CAN ID of the packet. In another embodiment, the destination of the data packet is determined responsive to an Ethernet IP of the packet. In one embodiment, only packets destined for particular ECUs 70 are analyzed.

Control flow instruction identification functionality 110 analyzes the data in the payload of the packet, responsive to the ECU model 150 of the ECU 70 which is the destination of the packet, to identify control flow instructions to memory addresses which contain gadgets. Particularly, as described above, in one embodiment each ECU model 150 sets a flag for each DWORD indicating whether the DWORD contains a gadget. In one embodiment, control flow instruction identification functionality 110 compares the destination of each control flow instruction in the payload to the addresses of the respective ECU model 150 to determine whether the flag of the respective address space is set to 1 or 0. In another embodiment, control flow instruction identification functionality 110 searches the payload for control flow instructions to address spaces which contain gadgets. It is noted that different ECUs 70 may have use the same address numbers, due to using different memories. Therefore, the gadget containing addresses are identified by both the address number and the identification of the destination ECU 70.

Analysis functionality 120 generates a statistical analysis of the control flow instructions to gadgets identified by identification functionality 110. Particularly, in one embodiment, analysis functionality 120 tracks the number of control flow instructions addressed to gadgets in a predetermined window in the packet. Particularly, a window of a predetermined size is defined and the packet is scanned using the window to determine the amount of control flow instructions addressed to gadgets in such a window throughout the packet data. In one further embodiment, the window is a moving window, i.e. the window begins from the beginning of the data and incrementally advances by a predetermined step size. Optionally, the predetermined step size is 1 byte. In one non-limiting embodiment, the window size is 20 bytes.

In another embodiment, the window is initialized when detecting a control flow instruction addressed to a gadget. Particularly, upon detecting a control flow instruction addressed to a gadget, the window is set such that it begins at the detected control flow instruction addressed to the gadget and the number of additional control flow instructions addressed to gadgets within the window is counted. After completion of the window, the next window is set upon detection of the next control flow instruction addressed to a gadget.

In one embodiment, the generated statistical analysis comprises the number of control flow instructions addressed to gadgets within a chain of control flow instructions addressed to gadgets. As described above, a chain of gadgets is a number of gadgets where each gadget in the chain initiates a control flow instruction address to the address of another gadget in the chain or an address within a predetermined distance of the address of another gadget in the chain. In one further embodiment, the generated statistical analysis comprises both: the number of control flow instructions addressed to gadgets within a chain of control flow instructions addressed to gadgets; and the number of control flow instructions addressed to gadgets within the predefined window.

Attack detection functionality 130 detects the presence of an ROP attack responsive to the statistical analysis generated by analysis functionality 120. Particularly, in the embodiment where the statistical analysis comprises the number of gadgets called within the predetermined window, attack detection functionality 130 compares the number of gadgets called to a predetermined window value. In the event that the number of gadgets called exceeds the predetermined window value, an ROP attack is identified.

In the embodiment where the statistical analysis comprises the number of control flow instructions addressed to gadgets within a chain of control flow instructions addressed to gadgets, attack detection functionality 130 compares the number of control flow instructions within the chain to a predetermined chain value. In the event that the number of gadgets called within a chain exceeds the predetermined chain value, an ROP attack is identified. In one embodiment, the predetermined chain value is determined responsive to the respective ECU model 150, i.e. there is a respective predetermined chain value for each ECU 70. In another embodiment, the chain of control flow instructions addressed to gadgets is compared to the information regarding the allowable chains of gadgets stored in the respective ECU model 150, and the comparison to the predetermined chain value is performed only for detected chains which are not stored as allowable chains. Thus, in such an embodiment, detection of the presence of an ROP attack is responsive to the respective unique ECU model 150.

In one embodiment, attack detection functionality 130 detects the presence of an ROP attack responsive to a predetermined function of both the number of control flow instructions addressed to gadgets within the predetermined window and the number of control flow instructions within one or more chains of gadgets. In one further embodiment, a different predetermined function is provided in each unique ECU model 150. Optionally, each predetermined function is determined responsive to the information regarding the allowable chains of gadgets in the respective ECU 70. Optionally, each predetermined function is determined responsive to a type of the respective ECU 70, such that a first type of ECUs 70 have associated therewith a first predetermined function that reduces the number of false positives and a second type of ECUs 70 have associated therewith a second predetermined function that reduces the number of undetected ROP attacks while allowing more false positives. Thus, in such an embodiment, detection of the presence of an ROP attack is responsive to the respective unique ECU model 150. Similarly, in one embodiment, each respective predetermined window value and each respective predetermined chain value is responsive to the type of the respective ECU 70.

Responsive to the identified ROP attack, output functionality 140 outputs a signal indicating the presence of an ROP attack. In one embodiment, responsive to the output signal, DCU 40 prevents further transmission of data to CAN bus networks 50. In one further embodiment, each packet is transmitted to the appropriate CAN bus network only after analysis of the packet and only in the absence of a signal indicating the presence of an ROP attack. In another embodiment, the above analysis of the packet is performed in parallel to the packet being transferred by DCU 40 to the destination ECU 70. In one further embodiment, the output signal is transmitted to a controller.

Figure 1E:
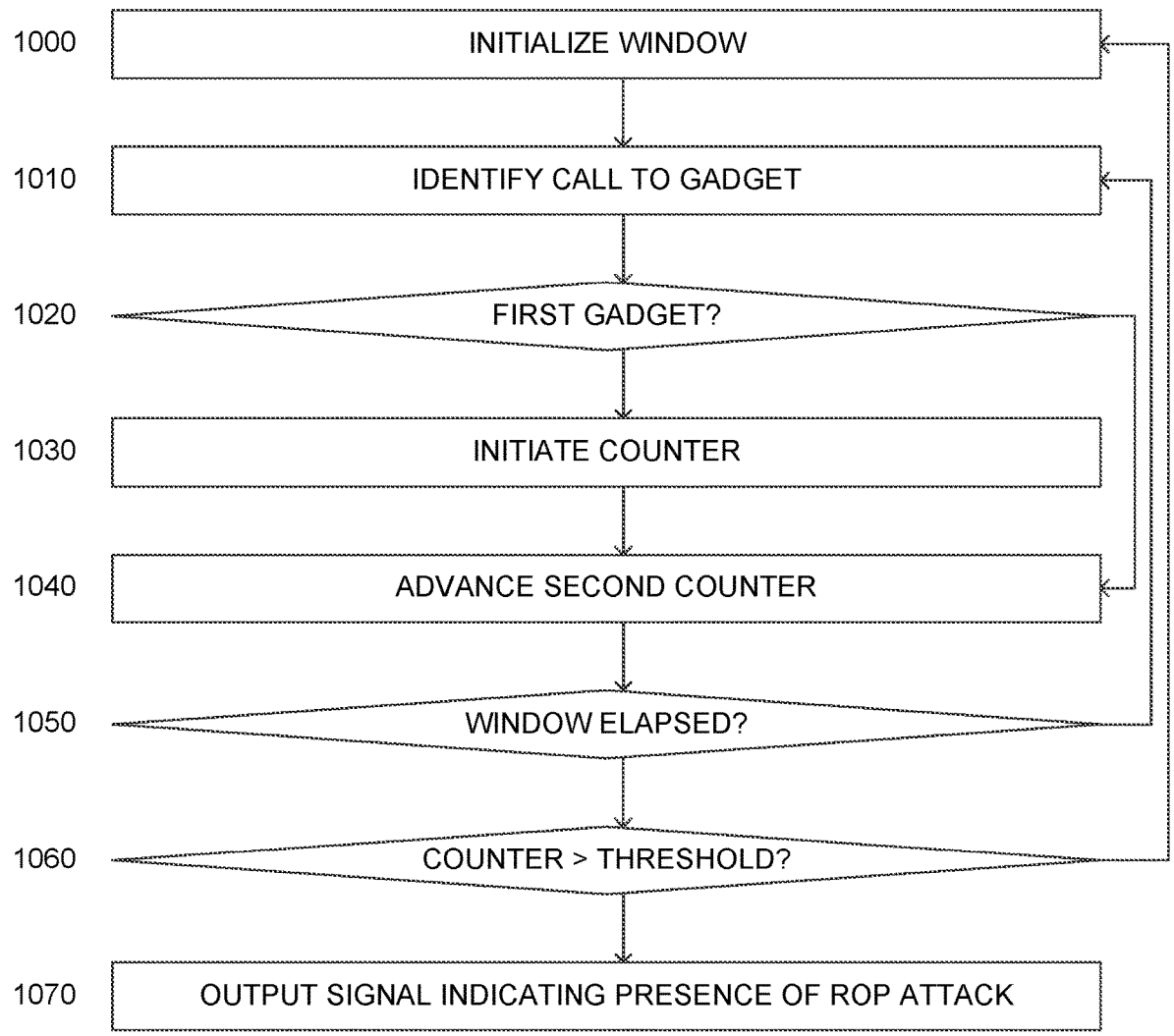
FIG. 1E illustrates a high level flow chart of a method of operation of an inspection program, in accordance with certain embodiments.

A high level flow chart of a method of operation of inspection program 35 is illustrated in FIG. 1E. In stage 1000, a window within the data of the received packet is initialized. In stage 1010, a control flow instruction within the window is analyzed to determine whether it addresses an address containing a gadget. In the event that a control flow instruction addressed to a gadget is identified, in stage 1020 a flag is checked to determine whether this is the first gadget to be identified in the current window. In the event that it is determined that this is the first gadget identified, in stage 1030 a counter is initiated and in stage 1040 the counter is advanced. In the event that it is determined that this is not the first gadget identified in the current window, stage 1040 is performed and the counter is advanced.

In stage 1050, the window of stage 1000 is analyzed to determine whether it has elapsed, i.e. whether the end of the window has been reached. In the event that the predetermined window has elapsed, in stage 1060 the value in the counter of stage 1030 is compared with a predetermined window value. In the event that the value in the counter is greater than the predetermined window value, in stage 1070 a signal is output indicating the presence of an ROP attack. I the event that in stage 1060 the value in the counter is determined to be not greater than the predetermined window value, stage 1000 described above is again performed, while moving the window by a predetermined step size, optionally 1 byte over. Optionally, in the event that an attack is detected, and the signal of stage 1070 is output, stage 1000 is also performed again.

In the event that in stage 1050 it is determined that the window of stage 1000 has not elapsed, stage 1010 is again performed. Stages 1000-1070 are repeated until reaching the end of the data packet. In one embodiment, stages 1000-1070 are repeated until reaching the end of the data packet or until an ROP attack is detected.

Advantageously, ROP attack protection system 20, which is optionally located within DCU 40, can verify data packets targeting remote ECUs 70, without the need of a separate protection system for each ECU 70. As described above, this verification is performed in one embodiment to detect ROP attacks based on utilization of gadgets, however the above and below described systems and methods are not limited to identification only of gadgets.

Figure 2:
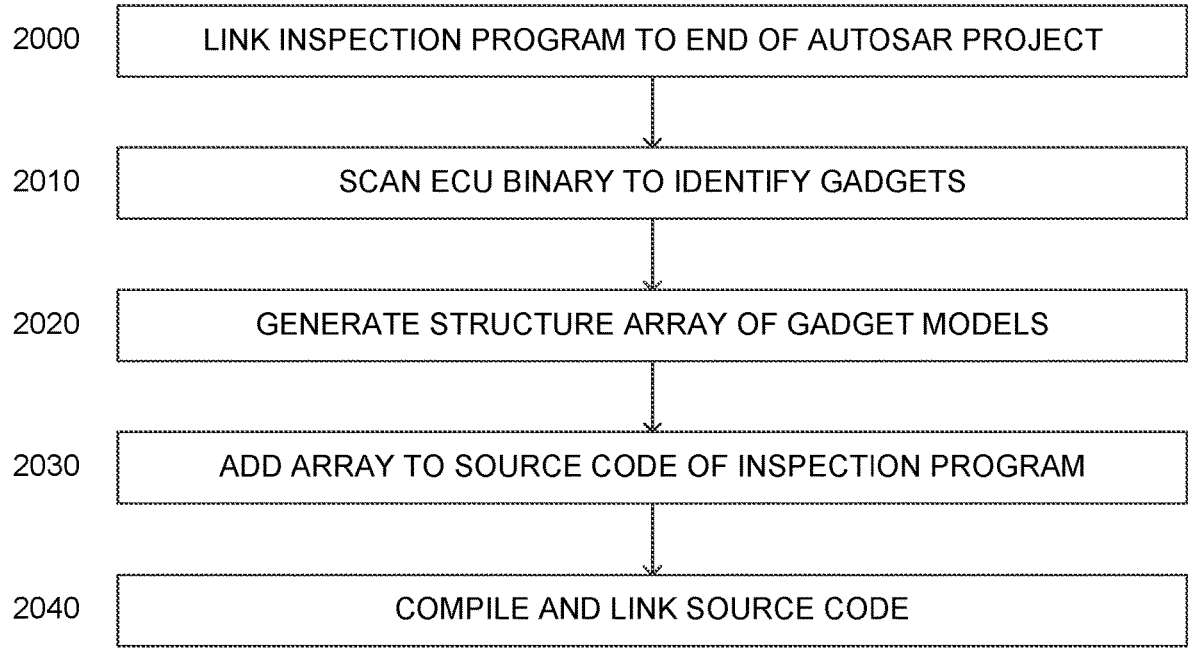
FIG. 2 illustrates a high level flow chart of a first embodiment of a method of adding ECU models to an AUTOSAR project.

FIG. 2 illustrates a high level flow chart of a first embodiment of a method of adding ECU models 150 to an AUTOSAR project. In stage 2000, inspection program 35 of ROP attack protection system 20 is linked to the end of the AUTOSAR project using a linker script. In stage 2010, the binary of an ECU is scanned to identify gadgets. In stage 2020, responsive to the gadget identification of stage 2010, an array of structures is generated, each structure of the array containing the ECU model 150 for a respective ECU 70. In stage 2030, the gadget structure array is added to the source code of inspection program 35. In the event that a gadget structure array already exists in the source code of inspection program 35, the structure array is updated with the new structure array of stage 2010. In stage 2040, the source code of inspection program 35, including the updated gadget structure array, is compiled and linked. Since inspection program 35 is linked to the end of the AUTOSAR project, the updated gadget structure array will now be part of the project.

Figure 3:
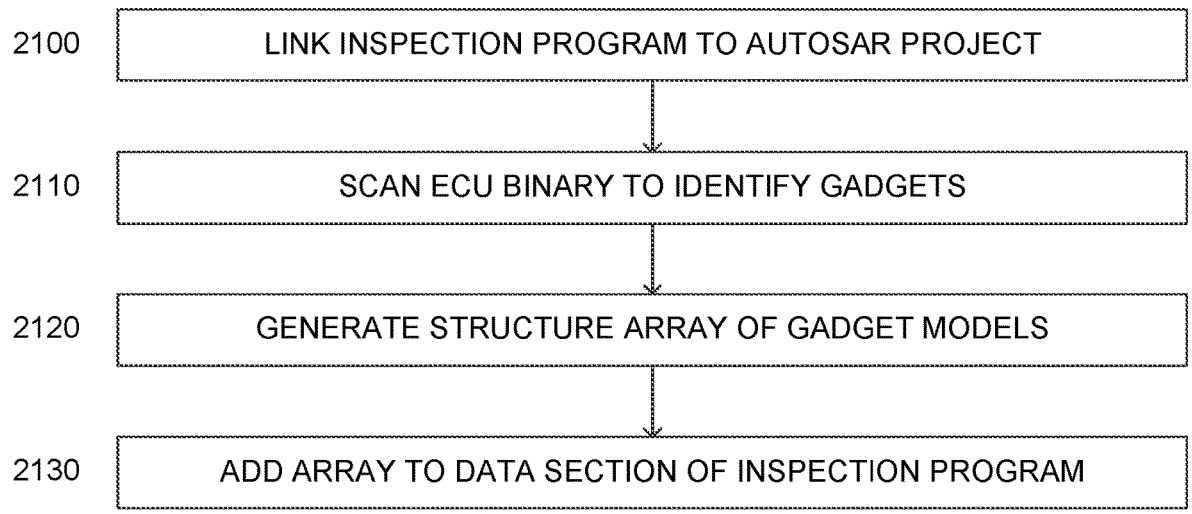
FIG. 3 illustrates a high level flow chart of a second embodiment of a method of adding ECU models to an AUTOSAR project.

FIG. 3 illustrates a high level flow chart of a second embodiment of a method of adding ECU models 150 to an AUTOSAR project. In stage 2100, inspection program 35 of ROP attack protection system 20 is linked to the AUTOSAR project using a linker script. In stage 2110, the binary of an ECU is scanned to identify gadgets. In stage 2120, responsive to the gadget identification of stage 2110, an array of structures is generated, each structure of the array containing the ECU model 150 for a respective ECU 70. In stage 2130, the structure array of stage 2120 is added to the data section of inspection program 35. In the event that a gadget structure array is already contained in the data section of inspection program 35, the gadget structure array is updated with the new structure array.

Figure 4:
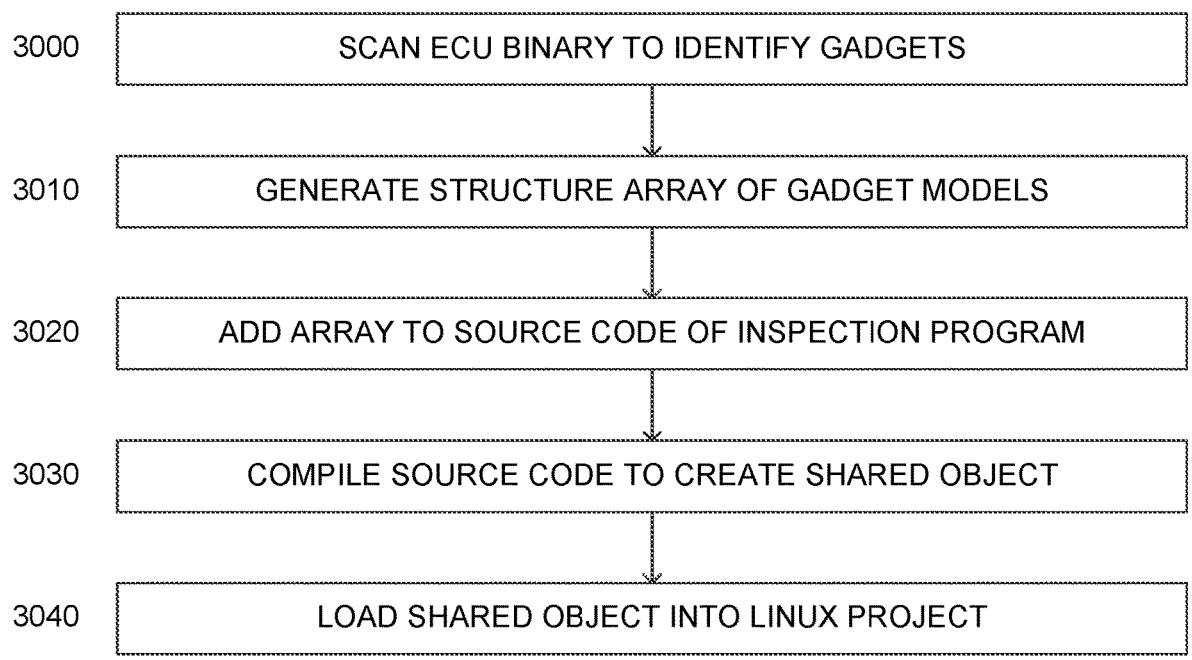
FIG. 4 illustrates a high level flow chart of a method of adding ECU models to a LINUX project.

FIG. 4 illustrates a high level flow chart of a method of adding ECU models 150 to a LINUX project. In stage 3000, the binary of an ECU is scanned to identify gadgets. In stage 3010, responsive to the gadget identification of stage 3000, an array of structures is generated, each structure of the array containing the ECU model 150 for a respective ECU 70. In stage 3020, the gadget structure array is added to the source code of ROP attack protection system 20. In the event that a gadget structure array already exists in the source code of ROP attack protection system 20, the structure array is updated with the new structure array of stage 3010. In stage 3030, the source code of ROP attack protection system 20, including the updated gadget structure array, is compiled to create a shared object. In stage 3040, the shared object of stage 3030 is loaded into the LINUX project. In one alternative embodiment, ROP attack protection system 20 runs separately, without being loaded into the LINUX project. Particularly, LINUX systems provide libraries which allow viewing network data traffic.

Figure 5:
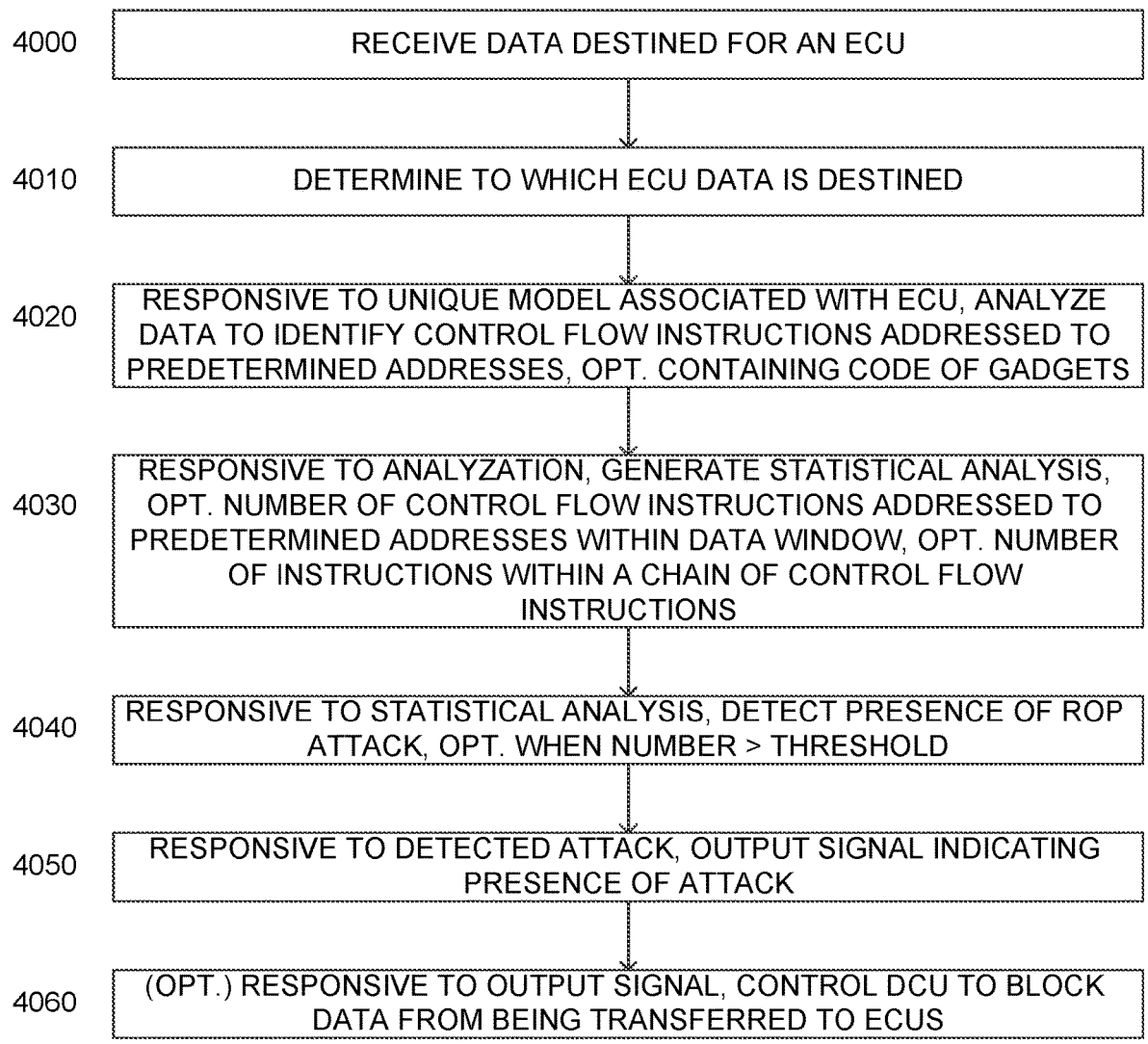
FIG. 5 illustrates a high level flow chart of an ROP attack protection method, in accordance with certain embodiments.

FIG. 5 illustrates a high level flow chart of an ROP attack protection method, in accordance with certain embodiments. In stage 4000, data destined for one of a plurality of ECUs is received. In stage 4010, the destination of the data of stage 4000, i.e. which one of the plurality of ECUs the data is destined for. In stage 4020, responsive to a unique model associated with the destination ECU of stage 4010, the received data is analyzed to identify one or more control flow instructions to predetermined addresses of a system memory. In one embodiment, as described above, each of the predetermined addresses in the system memory contains a gadget, however this is not meant to be limiting in any way. In another embodiment, each of the predetermined addresses in the system memory contain a predetermined type of code other than a gadget.

In stage 4030, responsive to the identified control flow instructions of stage 4020, a statistical analysis of the identified control flow instructions is generated. In one embodiment, the statistical analysis comprises the number of identified control flow instructions to predetermined addresses over a predetermined window within the received data. In another embodiment, the statistical analysis comprises the number of identified control flow instructions within a chain of identified control flow instructions. In stage 4040, responsive to the statistical analysis of stage 4030, the presence of an ROP attack is detected. In one embodiment, an ROP attack is detected responsive to the number of identified control flow instructions to predetermined addresses within the predetermined window being greater a predetermined window value. In another embodiment, an ROP attack is detected responsive to the number of identified control flow instructions within a chain of identified control flow instructions being greater than a predetermined chain value. In one embodiment, detection of the ROP attack is further responsive to the unique model of the respective ECU. In one further embodiment, as described above, the predetermined chain value, the predetermined window value and/or a predetermined function of both the number of identified control flow instructions within a window and the number of identified control flow instructions within a chain is responsive to the information in the unique model of the respective ECU.

In stage 4050, responsive to the detected attack of stage 4040, a signal indicating the presence of an ROP attack is output. In optional stage 4060, responsive to the output signal of stage 4050, a DCU is controlled to block data from being transferred to the plurality of ECUs of stage 4000.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A return-oriented programming (ROP) attack protection method for a plurality of electronic control units (ECUs), the method comprising:
   receiving data destined for one of the plurality of ECUs;
   determining which of the plurality of ECUs the received data is destined for;
   responsive to said determination, selecting a respective one of a plurality of models, each of the plurality of models associated with a respective one of the plurality of ECUs, wherein the selected model is associated with said determined ECU;
   responsive to the selected model, analyzing said received data to identify control flow instructions addressed to one or more predetermined addresses;
   responsive to said analyzation, generating a statistical analysis of said identified control flow instructions;
   responsive to said generated statistical analysis, detecting the presence of an ROP attack; and
   outputting a signal indicating said detected presence of an ROP attack.

2. The ROP attack protection method of claim 1, wherein each of the plurality of models comprises information regarding acceptable chains of gadgets for the respective ECU.

3. The ROP attack protection method of claim 2, wherein for each of the plurality of models, the acceptable chains of gadgets for the respective ECU are determined from the binary of the respective ECU.

4. The ROP attack protection method of claim 1, wherein said generated statistical analysis comprises the number of said identified control flow instructions within a predetermined window within said received data, said detection of the presence of an ROP attack being responsive to the number of said identified control flow instructions within the predetermined window exceeding a predetermined window value.

5. The ROP attack protection method of claim 1, wherein said detecting the presence of an ROP attack is further responsive to said respective unique model.

6. The ROP attack protection method of claim 1, wherein said generated statistical analysis comprises the number of said identified control flow instructions within a chain of said identified control flow instructions, said detection of the presence of an ROP attack responsive to the number of said identified control flow instructions within the chain of said identified control flow instructions exceeding a predetermined chain value.

7. The ROP attack protection method of claim 1, wherein said output signal controls a domain control unit (DCU) to block further data from being transferred to the plurality of ECUs.

8. The ROP attack protection method of claim 1, wherein said generated statistical analysis comprises the number of said identified control flow instructions addressed to gadgets within a predetermined window within said received data, said detection of the presence of an ROP attack being responsive to the number of said identified control flow instructions addressed to gadgets within the predetermined window exceeding a predetermined window value.

9. The ROP attack protection method of claim 1, wherein said generated statistical analysis comprises the number of said identified control flow instructions addressed to gadgets within a chain of said identified control flow instructions addressed to gadgets, said detection of the presence of an ROP attack responsive to the number of said identified control flow instructions addressed to gadgets within the chain of said identified control flow instructions addressed to gadgets exceeding a predetermined chain value.

10. A return-oriented programming (ROP) attack protection system comprising:
   a processor; and
   a memory, said memory having stored therein a plurality of a unique models, each unique model associated with a respective one of a plurality of electronic control units (ECUs),
   wherein said processor is arranged to:
      receive data destined for one of the plurality of ECUs;
      determine which of the plurality of ECUs the received data is destined for;

responsive to said determination, select a respective one of the plurality of unique models, wherein the selected model is associated with said determined ECU;

responsive to said selected model, analyze said received data to identify control flow instructions addressed to one or more predetermined addresses;

responsive to said analyzation, generate a statistical analysis of said identified control flow instructions;

responsive to said generated statistical analysis, detect the presence of an ROP attack; and output a signal indicating said detected presence of an ROP attack.

11. The ROP attack protection system of claim 10, wherein each of the plurality of models comprises information regarding acceptable chains of gadgets for the respective ECU.

12. The ROP attack protection system of claim 11, wherein for each of the plurality of models, the acceptable chains of gadgets for the respective ECU are determined from the binary of the respective ECU.

13. The ROP attack protection system of claim 10, wherein said generated statistical analysis comprises the number of said identified control flow instructions within a predetermined window within said received data, said detection of the presence of an ROP attack being responsive to the number of said identified control flow instructions within the predetermined window exceeding a predetermined window value.

14. The ROP attack protection system of claim 10, wherein said detection of the presence of an ROP attack is further responsive to said respective unique model.

15. The ROP attack protection system of claim 10, wherein said generated statistical analysis comprises the number of said identified control flow instructions within a chain of said identified control flow instructions, said detection of the presence of an ROP attack responsive to the number of said identified control flow instructions within the chain of said identified control flow instructions exceeding a predetermined chain value.

16. The ROP attack protection system of claim 10, wherein said output signal controls a domain control unit (DCU) to block further data from being transferred to the plurality of ECUs.

17. The ROP attack protection system of claim 10, wherein said generated statistical analysis comprises the number of said identified control flow instructions addressed to gadgets within a predetermined window within said received data, said detection of the presence of an ROP attack being responsive to the number of said identified control flow instructions addressed to gadgets within the predetermined window exceeding a predetermined window value.

18. The ROP attack protection system of claim 10, wherein said generated statistical analysis comprises the number of said identified control flow instructions addressed to gadgets within a chain of said identified control flow instructions addressed to gadgets, said detection of the presence of an ROP attack responsive to the number of said identified control flow instructions addressed to gadgets within the chain of said identified control flow instructions addressed to gadgets exceeding a predetermined chain value.

* * * * *